United States Patent [19]

Watts

[11] Patent Number: 5,118,079
[45] Date of Patent: Jun. 2, 1992

[54] REMOVABLE FLUID SEAL AND METHOD

[75] Inventor: Thomas A. Watts, Ames, Iowa

[73] Assignee: Sauer, Inc., Ames, Iowa

[21] Appl. No.: 729,357

[22] Filed: Jul. 12, 1991

[51] Int. Cl.$^5$ .............................................. F16K 3/28
[52] U.S. Cl. ...................................... 251/191; 138/89
[58] Field of Search .................. 138/90, 89, 92, 94; 251/190, 191

[56] References Cited

U.S. PATENT DOCUMENTS

| | | | |
|---|---|---|---|
| 1,600,137 | 9/1926 | Randolph | 138/90 |
| 1,993,307 | 3/1935 | Nicholson | 138/89 |
| 2,213,680 | 9/1940 | Share | 251/190 |
| 2,993,616 | 7/1961 | Carlile | 138/89 X |
| 3,292,897 | 12/1966 | McClelland | 251/191 X |
| 3,326,243 | 6/1967 | Augustus | 138/90 |
| 3,468,339 | 9/1969 | Gray | 251/191 X |

FOREIGN PATENT DOCUMENTS 588762 12/1959 Canada ............................ 251/191

*Primary Examiner*—Alan Cohan
*Attorney, Agent, or Firm*—Zarley, McKee, Thomte, Voorhees & Sease

[57] ABSTRACT

A removable fluid seal has a first deforming pin seated on a dead end of a fluid passage and a second deforming pin positioned in the opposite end of the fluid passage, with a spherical elastomeric member positioned between the first and the second deforming pins. A threaded plug is axially advanced through the fluid passage to force the deforming pins towards each other and resiliently distort the elastomeric member into a deformed state in which an outer surface of the sphere is forced into sealing engagement with the sidewall of the fluid chamber.

10 Claims, 2 Drawing Sheets

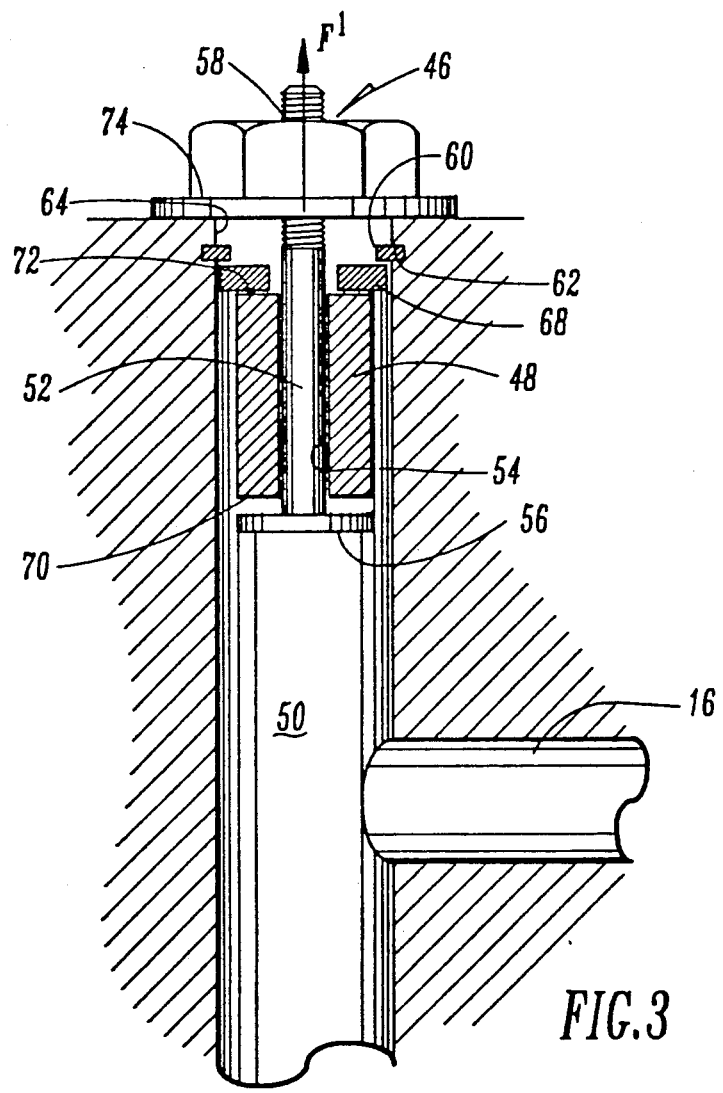

REMOVABLE FLUID SEAL AND METHOD

TECHNICAL FIELD

This invention generally relates to a fluid seal for use in hydraulic machinery and, more specifically, to a removable seal formed by deforming an elastomeric element within a pump or motor to isolate internal fluid passages.

BACKGROUND ART

Hydraulic and hydrostatic units, such as fluid pumps and motors, typically contain internal passages for routing pressurized fluids among various locations within the unit. In order to service different components of the mechanical systems in which the units are employed, as well as for servicing the units themselves, it often is desirable to block a particular passage within the unit and seal the passage to restrict pressurized fluid from passing to other passages or fluid ports in the unit. Fluid seals are used to establish the desired sealing of a flow passage.

Once a fluid seal has been formed and flow is adequately diverted within the hydraulic or hydrostatic unit, servicing or testing of the unit can be completed without undesired fluid interfering with the work. When the work is completed, in order to return the unit to a fully operable condition, the seal must be removed such that the previously blocked passage is unobstructed and the fluid no longer is restricted. A permanent plug would render the unit incapable of performing its intended function.

Due to the rather complex fluid routes within a hydraulic or hydrostatic unit, it frequently is difficult to gain physical access to a particular location within a passage. To isolate two branch passages extending from a remote end of a main passage, for example, it is necessary to form a seal in the main passage between the two branches. Accordingly, the capability of positioning a seal with relative accuracy within a remote portion of a fluid passage is an additional important feature for a fluid seal of the character described.

One approach toward providing a fluid seal within a passageway has been to insert an expandable tubular plug sleeve into a passageway and subsequently force a hardened spherical element through the plug, such that the plug is deformed plastically to assume the shape of the passageway and form a suitable seal therein. Such an approach is disclosed in U.S. Pat. No. 3,058,431 to Eddy, in which bulges are formed on the outer surface of an expandable plug to interengage the sidewall of a valve body, and also in U.S. Pat. No. 3,825,146 to Hirmann, in which a tubular plug sleeve has sharp-edged teeth engaging the sidewalls of a workpiece bore.

While the above approaches provide a reasonable seal, significant problems lie in the fact that, due to the nature of the deformation of the plug elements, the seal becomes permanently fixed within the passage. Further, damage to the passage can result from the impact of the expanded plug. Substantial cost and effort is required to remove the plug, particularly when the seal is formed at a nearly inaccessible location. Also, because of the high force levels required to deform the sealing elements, a surplus of material can result in costly damage to the interior of the passage when the elements are expanded. Thus, these designs require that the geometric tolerances of the different components be precisely controlled, and require plugging systems of different sizes for use with different sizes of fluid passages.

Another proposed solution to the problem of providing a fluid seal has been to deform a spherical member within a passage. U.S. Pat. No. 3,522,648 to Weber discloses a sealing method in which a ductile aluminum sphere is deformed to create a metal-to-metal bond within a bore in a mechanical device. This design has the deficiencies described above with respect to the limitations of a permanent seal. U.S. Pat. No. 3,077,204 to Bennet illustrates one-way check valves formed by an elastic ball within a valve chamber. This type of stop cannot be variably positioned within a machine, and requires the manufacturing of dedicated bores within a machine to seat the balls.

There is a need for a fluid seal in a hydraulic or hydrostatic unit which can be positioned selectively within a fluid passage and which easily can be removed for subsequent operability of the fluid unit. The seal must be easy to install without posing a threat to the integrity of the fluid passage or the unit. The present invention is directed to satisfying this need and overcoming one or more of the above problems.

SUMMARY OF THE INVENTION

An object, therefore, of this invention is to provide a new and improved removable fluid seal for isolating first and second portions of a fluid passage.

In one embodiment of the invention, a removable fluid seal is designed for use in a dead ended primary fluid passage having a pair of branch passages extending from first and second portions of the primary passage, with the removable seal located between the first and the second portions to prevent fluid communication between the branch passages. The fluid seal includes a first deforming pin seated at the dead end of the primary passage and an elastomeric sphere seated on the first deforming pin. A second deforming pin is positioned in an opposite end of the primary passage, with the elastomeric sphere sandwiched between the first and the second deforming pins. A threaded plug is axially advanced through the primary passage and against the second deforming pin to force the first deforming pin toward the other pin and resiliently distort the elastomeric sphere therebetween into a deformed state. The cross sectional area of the sphere is distorted and the outer surface of the sphere is forced into sealing engagement with the sidewall of the primary fluid passage.

To facilitate formation of the seal at a desired location within the primary passage, the first deforming pin is formed as a cylindrical element having an axial dimension suitable for supporting the elastomeric sphere at a preferred location in the passage. Both the first and the second deforming pins are formed of material having a hardness substantially greater than the hardness of the elastomeric sphere to assure the deformation of only the sphere as the deforming pins are drawn together. The deforming pins have a radial dimension sufficient to allow unrestricted axial movement of the pins within the primary passage, such that the pins may be dropped into portions of an elongated passage which would otherwise be beyond reach.

Due to the high resilience of elastomeric materials, the exemplary fluid seal easily can be removed from a fluid passage. The threaded plug is withdrawn from the primary passage and the elastic restoring forces generated by the elastomeric sphere repel the deforming pins and allow the sphere to return to its undeformed, unobstructing size. The deforming pins and the elastomeric sphere then can be simply extracted from the passage by inverting the hydraulic unit and allowing the components to fall freely from the unit under their own weight.

In an alternate form of the invention, a removable fluid seal is provided for use in a fluid passage not necessarily having a dead end. The fluid seal has a cylindrical elastomeric plug with an axial opening. An elongated rod having an enlarged end is inserted through the opening in the plug and extended into the fluid passage, with the elastomeric plug seated on the enlarged end of the rod. A resilient snap ring is secured within a groove formed in the sidewall of the fluid passage to form a stop preventing withdrawal of the elastomeric plug from the passage. When an axial force is applied to the elongated rod, the elastomeric plug is deformably forced against the snap ring. The cross sectional area of the elastomeric member is distorted and deformed into sealing engagement with the sidewall.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and advantages, can be understood from the following description taken in conjunction with the accompanying drawings, in which like reference numerals identify like elements in the figures and in which:

FIG. 3 is a diagrammatic illustration of an alternative embodiment of the removable fluid seal.

DETAILED DESCRIPTION OF THE INVENTION

Figure 1:
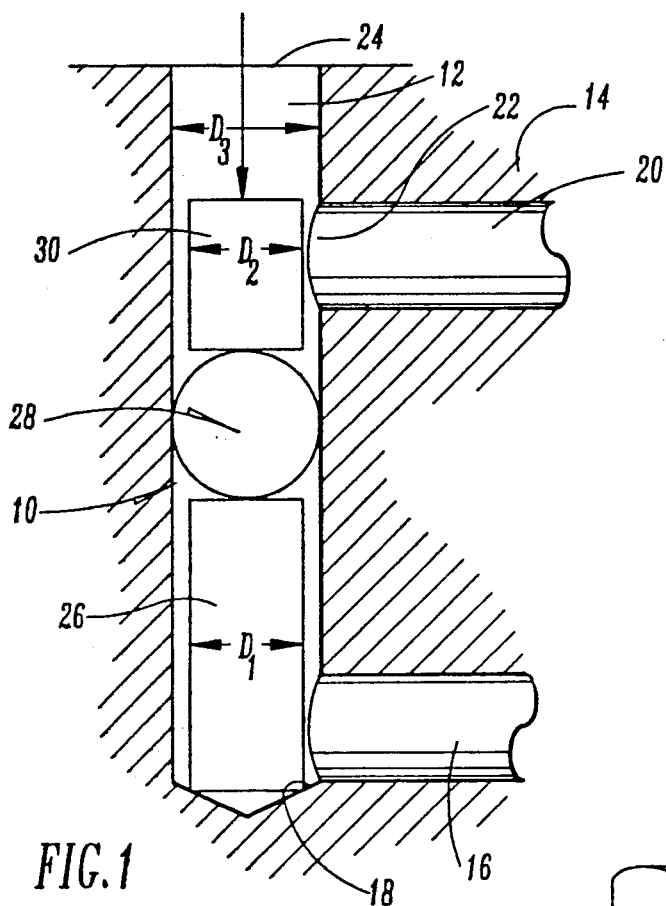
FIG. 1 is a diagrammatic illustration of one embodiment of a removable fluid seal according to the invention, with an elastomeric element in an undeformed configuration.

Referring first to FIG. 1, a removable seal is shown generally at 10 within a cylindrical fluid passage 12 formed in a fluid machine 14 which could take the form of a hydraulic or a hydrostatic unit, such as a fluid pump or motor. A pressure line 16 communicates with a dead end 18 of fluid passage 12, and a pressure line 20 communicates with fluid passage 12 at an opening 22 formed between dead end 18 and a port 24. Fluid seal 10 includes a cylindrical pin 26 seated at dead end 18 of fluid passage 12 and supporting a deformable spherical member 28 immediately thereabove. A second cylindrical pin 30 rests above deformable member 28.

Figure 2:
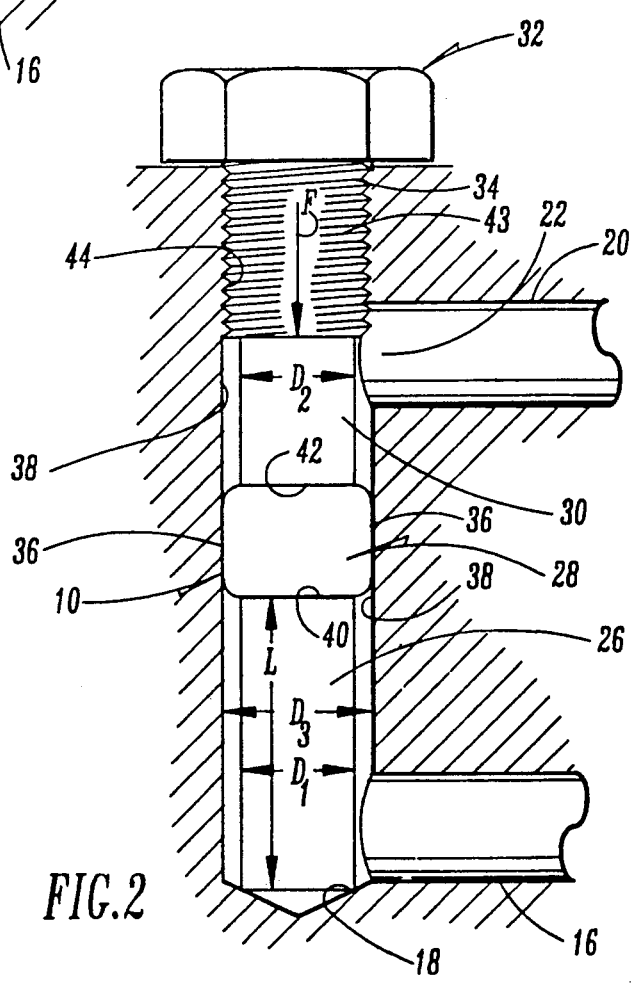
FIG. 2 is a diagrammatic illustration of the removable fluid seal, with the elastomeric sphere in a deformed configuration.

In order to effect a seal in fluid passage 12 and thereby isolate flows in pressure lines 16 and 20, the deformable member 28 is expanded radially to fill cylindrical fluid passage 12 as illustrated in FIG. 2. A T-shaped plug 32, having a threaded cylindrical stem 34, is axially advanced through fluid passage 12 and forced into contact with cylindrical pin 30 to elastically compress deformable member 28 between lower pin 26 and upper pin 30. The cross section of deformable member 28 is resiliently distorted with an outer surface 36 forced into sealed engagement with side wall 38 of fluid passage 12.

Deformable member 28 preferably is formed of a viscous elastomeric material. Each of the cylindrical pins 26 and 30 are formed of a material having a hardness greater than that of deformable member 28, whereby clamping of the pins and deformation of member 28 results in minimal deformation of the pins.

Cylindrical pins 26 and 30 have diameters D1 and D2, respectively, which are less than the diameter D3 of fluid passage 12. With this construction, cylindrical pins 26 and 30 are loose fitting and can be dropped freely into position within fluid passage 12. In order to accurately position a resulting seal between pressure lines 16 and 20, cylindrical pin 26 has an axial dimension "L" suitable for positioning deformable member 28 at a preferred location within the fluid passage.

T-shaped plug 32 is a substantially rigid member and transmits an axial force "F" sufficient to deform the elastomeric member 28. Cylindrical pins 26 and 30 have planar end faces 40 and 42, respectively, which engage deformable member 28 to provide an optimal seal within fluid passage 12. Threads 43 formed on the cylindrical stem 34 of plug 32 engage complementary grooves 44 formed in the fluid passage side walls 38 to maintain pressure on cylindrical pin 30 and sustain the expanded configuration of deformable member 28.

The above construction provides a fluid seal which can be positioned selectively within a fluid passage by varying the axial dimensions of the deforming pins 26 and 30. By utilizing deforming pins and an elastomeric member which have a dimension capable of passing freely through the fluid passage, it is possible to place the fluid seal at nearly inaccessible locations within a unit.

The seal can be removed easily for subsequent operability of the unit due to the highly elastic nature of the elastomeric deformable member 28. Rather than requiring costly and damaging drilling to remove the seal, to remove the seal 10 from fluid passage 12, plug 32 is disengaged from fluid port 24 and force is released from the upper deforming pin. Elastic restoring forces generated within the deformed elastomeric member 28 repel the deforming pins 26 and 30, and allow the member to return to an undeformed, unobstructing state. The deforming pins and the elastomeric member then can be simply extracted from the passage by inverting the hydraulic unit and allowing the components to fall freely from the unit under their own weight. In applications where it is not possible to invert the hydraulic unit, an elongated magnetic extraction tool is inserted into the passage to remove deforming pin 30. A probe having an end adapted to engage the elastomeric member is then used to remove the member from the fluid passage, and the magnetic extraction tool is used to remove deforming pin 26.

The compliance of the elastomeric member reduces the importance of the tolerance and shape of the passage to be plugged. When placed under pressure, the deformable member will expand uniformly in radial directions to fill the surrounding space, regardless of the shape of that space. It is not necessary that the deformable member have a spherical geometry. In order to improve the seal, the present invention envisions that a substantially cylindrical member can be used, or, alternatively, that a number of deformable members are stacked between the deforming pins.

An alternative embodiment of a fluid seal is generally designated 46 in FIG. 3 and has a cylindrical elastomeric plug 48 positioned within a fluid passage 50. An elongated rod 52 extends through an axial opening 54 in elastomeric plug 48 and has an enlarged end 56 for seating the plug at a preferred location within the fluid passage. Rod 52 has an upper end 58 extending outside fluid passage 50.

An annular snap ring 60 resiliently engages a circumferential groove 62 formed in the sidewall 64 of fluid passage 50 and projects radially inward to define a stop for constraining axial withdrawal of elastomeric plug 48 from the fluid passage. A washer 68 is positioned between elastomeric plug 48 and snap ring 60.

In order to form a removable fluid seal within the fluid passage 50, an axial force is applied to elongated rod 52 in the direction indicated by arrow F' to force enlarged end 56 against the bottom 70 of elastomeric plug 48 and clamp the plug against washer 68 and snap ring 62. Continued application of axial force to rod 52 results in the elastic compression of plug 48 with interposed washer 68 distributing a reaction force over the top 72 of the elastomeric plug. In order to maintain elastomeric plug 48 in a compressed state, end 58 of elongated rod 52 is threaded and engages a retaining nut 74 outside fluid passage 50. When it is desired to remove the fluid seal, retaining nut 74 is loosened to permit the axial displacement of rod 52 as elastomeric plug resiliently expands to an undeformed state.

The alternative embodiment of a removable fluid seal illustrated in FIG. 3 thus is adapted for use in fluid passages which do not have a dead end. That is, by utilizing elongated rods 52 having varying lengths, it is possible to form a removable fluid seal at any desired point within a fluid passage. Rather than requiring a dead end for supplying a reaction force when compressing an elastomeric plug, a snap ring is secured within the fluid passage and opposes axial displacement of the plug.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A removable fluid seal for isolating first and second portions of a fluid passage defined by a peripheral sidewall, and a passage restriction means, the fluid seal comprising:

first deforming means movably positioned in said first fluid passage portion; and having its movement in one direction blocked by said passage restriction means, second deforming means movably positioned in said second fluid passage portion;

an elastomeric member interposed between the first and the second deforming means; and pressure means for advancing the second deforming means toward the first deforming means to resiliently distort the elastomeric member therebetween, an outer surface of the elastomeric member thereby being urged into sealing engagement with the sidewall to isolate the first and second fluid passage portions, said first and second deforming means and said elastomeric member being free from mechanical interconnection with each other, and with said fluid passage to permit their free removal from said fluid passage portions when completely released from the presence of said pressure means.

2. The removable fluid seal of claim 1 in which the fluid passage is dead ended, the first deforming means comprises a first elongated pin freely disposed on the dead end of the passage and supports the elastomeric element within the passage.

3. The removable fluid seal of claim 2 in which the first elongated pin has a predetermined axial dimension for supporting the elastomeric element at a preferred distance away from the dead end of the passage.

4. The removable fluid seal of claim 2 in which the second deforming means comprises a second elongated pin axially movable within the passage.

5. The removable fluid seal of claim 4 in which the first and the second elongated pins are formed of material having a hardness substantially greater than the hardness of the elastomeric member, whereby minimal deformation of the first and the second pins results when the second pin is advanced toward the first pin to elastically deform the elastomeric member therebetween.

6. The removable fluid seal of claim 1 in which the means for advancing the second deforming means toward the first deforming means comprises an internally threaded opening at an end of the fluid passage, and an externally threaded member in threaded engagement with the opening whereby rotation of the member advances the second deforming means toward the first deforming means.

7. The fluid seal of claim 6 in which the externally threaded member has a length suitable for achieving a desired amount of deformation of the elastomeric member.

8. The fluid seal of claim 1 in which the elastomeric member is a spherical member.

9. The fluid seal of claim 1 including a plurality of elastomeric members stacked between the first deforming means and the second deforming means.

10. The fluid seal of claim 1 in which the fluid passage is a cylindrical passage.

* * * * *